(12) United States Patent
Chen

(10) Patent No.: US 8,531,163 B2
(45) Date of Patent: Sep. 10, 2013

(54) SWITCHING POWER SUPPLY DEVICE, INTEGRATED CIRCUIT, AND SWITCHING POWER SUPPLY DEVICE OPERATION CONDITION SETTING METHOD

(75) Inventor: Jian Chen, Matsumoto (JP)

(73) Assignee: Fuji Electric Co., Ltd., Kawasaki-shi (JP)

( * ) Notice: Subject to any disclaimer, the term of this patent is extended or adjusted under 35 U.S.C. 154(b) by 125 days.

(21) Appl. No.: 13/256,429

(22) PCT Filed: Mar. 12, 2010

(86) PCT No.: PCT/JP2010/054218
§ 371 (c)(1),
(2), (4) Date: Nov. 18, 2011

(87) PCT Pub. No.: WO2010/104172
PCT Pub. Date: Sep. 16, 2010

(65) Prior Publication Data
US 2012/0049823 A1 Mar. 1, 2012

(30) Foreign Application Priority Data
Mar. 13, 2009 (JP) ................................. 2009-061606

(51) Int. Cl.
*G05F 1/40* (2006.01)
(52) U.S. Cl.
USPC .............. 323/222; 323/285; 323/902; 363/49
(58) Field of Classification Search
USPC .................. 323/222, 282–285, 351, 902, 908; 363/49
See application file for complete search history.

(56) References Cited

U.S. PATENT DOCUMENTS

| | | | | |
|---|---|---|---|---|
| 7,129,679 B2 * | 10/2006 | Inaba et al. | .................... | 323/222 |
| 7,208,985 B2 * | 4/2007 | Yamashita | ..................... | 327/108 |
| 7,262,582 B2 * | 8/2007 | Warita et al. | .................. | 323/222 |
| 8,120,343 B2 * | 2/2012 | Kunimatsu | ..................... | 323/282 |
| 2006/0209581 A1 | 9/2006 | Choi et al. | | |
| 2007/0046294 A1 | 3/2007 | Matthews et al. | | |
| 2011/0006694 A9 * | 1/2011 | Tamegai et al. | ........... | 315/209 R |

FOREIGN PATENT DOCUMENTS

| | | |
|---|---|---|
| JP | 5-211715 A | 8/1993 |
| JP | 5-316772 A | 11/1993 |
| JP | 2003-079140 A | 3/2003 |

(Continued)

*Primary Examiner* — Jessica Han
(74) *Attorney, Agent, or Firm* — Rabin & Berdo, P.C.

(57) ABSTRACT

To provide a switching power supply device, and an operation condition setting method thereof, wherein it is possible to set an operation condition during an initialization period by adjusting the resistance value of a resistor that grounds an OUT terminal or IS terminal.

A switching power supply device includes an oscillator circuit (3) that regulates the switching frequency of a switching element (Q1), a drive circuit (4) that turns (Q1) on and off based on an oscillation signal from the oscillator circuit (3), a condition setting circuit (6), disposed inside a power supply control IC (100) configured to include the oscillator circuit (3) and drive circuit (4), that outputs a condition indicating signal for indicating an operation condition of the switching power supply device, and a control circuit (1) that instructs the condition setting circuit (6) to determine a condition indicating signal within an initialization period immediately after the start of a supply of power to the power supply control IC (100), wherein a first resistor (R1) having an adjusted resistance value is connected to an external terminal of the power supply control IC (100) from which is output a drive signal to (Q1).

14 Claims, 14 Drawing Sheets

(56) References Cited

FOREIGN PATENT DOCUMENTS

| JP | 2007-014082 A | 1/2007 |
| JP | 2007-073954 A | 3/2007 |
| JP | 2007-258294 A | 10/2007 |
| JP | 2008-533972 A | 8/2008 |

* cited by examiner

| CONDITION SET | CONDITION 1 | CONDITION 2 | CONDITION 3 |
|---|---|---|---|
| RESISTANCE R1 [kΩ] | 5.6 | 12 | 18 |
| CONDITION SIGNAL CS1 | H | L | L |
| CONDITION SIGNAL CS2 | H | H | L |
| OSCILLATION FREQUENCY [kHz] | 70 | 60 | 50 |

FIG. 13

| CONDITION SET / CONDITION INDICATING SIGNAL | CONDITION 1 | CONDITION 2 | CONDITION 3 | CONDITION 4 | CONDITION 5 | CONDITION 6 |
|---|---|---|---|---|---|---|
| CS_max | L | L | L | H | H | H |
| CS1 | H | L | L | H | L | L |
| CS2 | H | H | L | H | H | L |

SWITCHING POWER SUPPLY DEVICE, INTEGRATED CIRCUIT, AND SWITCHING POWER SUPPLY DEVICE OPERATION CONDITION SETTING METHOD

TECHNICAL FIELD

The present invention relates to a switching power supply device that has a condition setting function relating to a power supply action, an integrated circuit that carries out a control of the device, and an operation condition setting method of the device, and in particular, relates to a switching power supply device, an integrated circuit, and an operation condition setting method of the device that can easily set function parameters and/or an operation mode.

BACKGROUND ART

A switching power supply device is mounted in an electronic instrument such as, for example, a portable telephone or digital camera, and is used for raising or lowering an input voltage, and supplying the voltage to a load. With this kind of switching power supply device, a condition relating to a power supply action is set by various methods in accordance with power supply specifications required by the electronic instrument.

As important parameters, such as switching frequency, relating to the switching power supply device affect power supply noise characteristics, part size, part withstand voltage, temperature rise, and the like, a number of setting methods have been conceived. A switching power supply circuit shown in Japan Patent No. JP-A-2007-14082 below raises a direct current voltage supplied from a direct current power source, and supplies the voltage to six white light emitting diodes LED1 to LED6, which are a load, thereby attempting to drive the white light emitting diodes LED1 to LED6. In the switching power supply circuit, an externally attached resistor R1 is provided as an adjusting resistor in an oscillator circuit of a boost chopper regulator in order to adjust the switching frequency.

Normally, when the switching power supply circuit is used in an electronic instrument such as a portable instrument, liquid crystal television, or DVD player, of noise emitted from the switching power supply circuit, there is noise that has an adverse effect on another LSI inside the electronic instrument, and noise that does not. In the invention of the switching power supply circuit shown in Japan Patent No. JP-A-2007-14082, there is a linear relationship between the resistance value of the externally attached resistor R1 and the switching cycle, because of which the designer of the electronic instrument can freely change the switching cycle by replacing one externally attached resistor R1, and adjustment of emitted noise is easy. However, there remains a problem in that, in order to apply the invention to a power supply control IC (integrated circuit) including a boost chopper regulator, an additional dedicated terminal to which the frequency adjusting resistor is connected is necessary.

The number of terminals of a power supply control IC for controlling a switching power supply device is limited owing to requests to suppress cost, package area, and the like. Because of this, it is often the case that no dedicated terminal setting a parameter other than the heretofore described switching frequency is provided in the power supply control IC. In this case, in order to satisfy the power supply specifications of a large variety of electronic instruments, there is no option but to respond by increasing the lineup of the power supply control IC itself.

However, in the event that the lineup of the power supply control IC increases for individual electronic instrument power supply specifications, this also leads to an increase in product cost. Therefore, in order to reduce the cost of the electronic instrument, there is a demand for a product wherein it is possible to select a plurality of necessary kinds of operation condition with one power supply control IC.

As a way of responding to this kind of request, an invention of "A Method and Device that Select a Parameter/Mode Based on Time Measurement", wherein a setting of an operation condition is carried out during an initialization period of a power supply control IC utilizing a multi-functional capacitor, without increasing the number of terminals of the power supply control IC, is disclosed in Japan Patent No. JP-A-2007-73954 below. The invention, in order to carry out a selection from a plurality of function parameters or operation modes, attempts to realize a setting of a plurality of operation conditions with a single part by, for example, selecting the capacitance value of a specific multi-functional capacitor joined to a pin of an integrated circuit, or the like. Herein, the multi-functional capacitor, as well as setting a function parameter, operation mode, or other device characteristic in the initialization period, has some kind of normal function during a normal operation of the integrated circuit. For example, it is possible to utilize a VCC pin decoupling capacitor, feedback pin loop compensation capacitor, or the like, as a parameter/mode selection capacitor during an initialization.

In Japan Patent No. JP-A-2007-73954, in order to divert a capacitor originally disposed with another object, such as the heretofore described VCC pin decoupling capacitor or feedback pin loop compensation capacitor, to a mode setting, the capacitance value of the capacitor is determined, and the mode setting is appropriately carried out. However, after the mode setting in the initialization period is finished, the capacitor is used for the original object thereof. For this reason, the capacitance value of these capacitors has to be set to a size appropriate for realizing the original object thereof.

Herein, the original object of the feedback pin loop compensation capacitor being to compensate the frequency characteristics of a power supply control IC feedback pin loop, it is disposed so that the power supply control feedback loop in a switching power supply device does not become unstable. In the event that the capacitance value of the feedback pin loop compensation capacitor is set smaller than a value optimal for the stability of the feedback loop, the system becomes unstable and oscillates. Conversely, when the capacitance value is set larger than the optimal value, response as a power supply system is slow and, for example, it is not possible to recover the output voltage immediately even when the load fluctuates. Consequently, the capacitance value of the capacitor has a large effect on the response of the feedback system, and there are problems that restrict the design itself of the switching power supply device, such as adjustment of phase compensation being limited or the power supply oscillating abnormally, due to a change of the capacitance value.

Also, generally, the following three kinds of cases are envisaged as methods of supplying a VCC voltage to a power supply control IC. A first case makes a VCC voltage in an internal regulator from an external power supply connected to a separate terminal, as in the heretofore described Japan Patent No. JP-A-2007-73954. A second case makes a VCC voltage with a start up current generated by a start up circuit (corresponding to the internal regulator of the first case) connected to an external power source in an initialization period at a start up time, and receives a supply of the VCC voltage from an auxiliary coil at a time of a normal operation. A third case utilizes an external VCC power supply.

In order to utilize the VCC pin decoupling capacitor as a multi-functional capacitor, a regulator that generates a constant current for charging the capacitor is needed in the power supply control IC. This is because the VCC pin decoupling capacitor is connected to the VCC pin (between the VCC pin and the ground) of the power supply control IC in order to supply power to the power supply control IC itself. However, the VCC pin decoupling capacitor functions as a buffer when the power supply becomes insufficient due to the current consumption of the power supply control IC increasing, or when there is a fluctuation in the power supply voltage, and also functions so as to remove noise such as a ripple on the VCC line. Therefore, in order to realize this kind of original object, it is necessary that the capacitance value of the VCC pin decoupling capacitor is made large to a certain extent. Because of this, when attempting to charge the large capacitance value of the VCC pin decoupling capacitor with a constant current in a short period, it is necessary that the value of the constant current from the regulator is set large, and a large scale regulator has to be used in order to cause a large constant current to be generated. Consequently, a problem with cost occurs.

Also, in the third case, as power is supplied by the VCC pin being connected to an external power supply, the VCC pin decoupling capacitor is constantly in a condition in which it is connected to the external power supply. However, even when the VCC pin decoupling capacitor is charged by a constant current in this kind of connection condition, it is not possible to determine whether charging is done by a current from the external power supply, or whether charging is done by a constant current generated in the power supply control IC. That is, in order to utilize the VCC pin decoupling capacitor in a mode setting in an initialization period, it is necessary to disconnect the VCC pin from the external power supply, and a circuit for this disconnecting is provided in the exterior of the power supply control IC. Consequently, it can be said that the method of Japan Patent No. JP-A-2007-73954 is inappropriate for being applied to the third case and setting a parameter/mode.

As above, with the method of Japan Patent No. JP-A-2007-73954 utilizing a multi-functional capacitor, there are problems in that the multi-functional capacitor is difficult to use because the normal function is directly affected, it is necessary to provide a large scale regulator which leads to an increase in cost, the method may not be applicable depending on the method of supplying the VCC voltage, and the like.

Furthermore, in a separate Japan Patent No. JP-A-2007-258294, a description is given of a semiconductor integrated circuit wherein a mode switching signal is input without increasing the number of terminals. Herein, utilizing a terminal, among terminals necessary for a normal operation, wherein there is a difference between an input voltage range of a power supply voltage and that of a ground potential at a time of a normal operation, when a voltage near the power supply voltage or a voltage near the ground potential is input into the terminal, a switching of the semiconductor integrated circuit mode is carried out. Consequently, according to the technology of Japan Patent No. JP-A-2007-258294, there is provided a semiconductor integrated circuit wherein it is possible to input a mode switching signal without increasing the number of terminals.

SUMMARY OF THE INVENTION

Problems that the Invention is to Solve

However, in Japan Patent No. JP-A-2007-258294, a switching between a test mode and normal operation mode is carried out using a power supply control IC feedback terminal FB into which is input a feedback signal Vfb. Consequently, in order to alternately supply the FB terminal with a mode setting signal and feedback signal, it is necessary to provide in the exterior of the power supply control IC a circuit that generates a mode setting signal, and switches between the mode setting signal and a feedback signal. Although there is no problem with this kind of mode switching method in a test before mounting the power supply control IC in a product, it is difficult to implement the method after mounting the power supply control IC in a switching power supply device.

FIG. 15 is a circuit diagram showing a heretofore known average current control switching power supply device.

The switching power supply device is configured in such a way as to apply a constant voltage to a load using a power supply control IC 10, and an input terminal 11 thereof is connected via a reactor L1 and diode D1 in series to an output terminal 12, to which is connected a load (not shown). A connection point of the reactor L1 and diode D1 is connected to the drain terminal of a switching element Q1 such as, for example, an N-channel type power MOSFET, and the source terminal of the switching element Q1 is grounded. Also, a connection point of the diode D1 and output terminal 12 is grounded via a capacitor C2, and a rectifying and smoothing circuit is configured of the diode D1 and capacitor C2.

The power supply control IC 10 is configured of a control circuit 1, a VCC detection circuit 2, an oscillator circuit 3, a drive circuit 4, an output voltage detection circuit 5, and the like, inside the power supply control IC 10. Also, the power supply control IC 10 includes a control output OUT terminal, a power supply input VCC terminal, a VDET terminal for detecting the voltage of the input terminal 11, an Icomp terminal for compensating the phase of a current feedback system error amplifier, a Vcomp terminal for compensating the phase of a voltage feedback system error amplifier, an IS terminal into which is input a sense current signal, an FB terminal into which is input a feedback signal of a voltage feedback system, and a ground connection GND terminal current.

The OUT terminal is connected to the gate terminal of the switching element Q1 grounded via a resistor R1, and a turning on and off of the switching element Q1 is controlled by a control voltage Vout output from the gate terminal. A power supply voltage Vcc is supplied from a power supply terminal 13 to the VCC terminal. The VDET terminal is connected to a connection point of resistors R11 and R12 serially connected between the input terminal 11 and the ground. The Icomp terminal and Vcomp terminal are grounded via capacitors C3 and C4 respectively. The IS terminal is connected to a connection point of a capacitor C1 and resistor R21 serially connected between the input terminal 11 and the ground. The FB terminal is connected to a connection point of resistors R13 and R14 serially connected between the output terminal 12 and the ground.

The power supply control IC 10 is such that, when an input power supply voltage Vi is supplied to the input terminal 11, the switching element Q1 disposed between the input power supply voltage Vi and the load is on/off controlled by the control voltage Vout. In this way, the power supply control IC 10 operates so as to supply an output voltage V0 to the load connected to the output terminal 12 of the switching power supply device.

Although the power supply control IC 10 has no terminal for adjusting the oscillation frequency of the oscillator circuit 3, when a frequency adjusting terminal is added, the number of terminals increases from eight pins to nine pins. As there is a large difference in size and cost between an eight pin package and a package of nine pins or more, it is difficult to additionally provide a frequency adjusting pin.

With the heretofore known switching power supply device configured in this way, even when applying the technology of the heretofore described Japan Patent Nos. JP-A-2007-14082 and JP-A-2007-73954, and the like, and attempting to set in advance an operation condition in accordance with power supply requirement specifications expected of an electronic instrument, there remain the disadvantages of additionally providing a condition setting terminal, an increase in cost, and making power supply design difficult. Also, when applying the technology of Japan Patent No. JP-A-2007-258294, it is difficult to carry out a mode switching after the power supply control IC is mounted in the switching power supply device.

The invention, having been contrived bearing in mind these kinds of point, has an object of providing a switching power supply device, an integrated circuit, and an operation condition setting method of the switching power supply device, wherein it is possible to set an operation condition by adjusting the resistance value of a resistor connected between an OUT terminal or IS terminal of the integrated circuit and the ground during an initialization period of a switching power supply.

Means for Solving the Problems

In the invention, in order to solve the heretofore described problems, there is provided a switching power supply device, wherein a transformer or reactor and a switching element are disposed between an input power supply and a load, having a power supply control integrated circuit for applying a constant output voltage to the load by controlling a turning on and off of the switching element. The integrated circuit of the switching power supply device includes a drive circuit that turns the switching element on and off, a condition setting circuit that outputs a condition indicating signal for indicating an operation condition of the switching power supply device, and a control circuit that instructs the condition setting circuit to determine the operation condition of the switching power supply device, and is characterized in that a first resistor having a resistance value adjusted to a predetermined size is connected to a control output external terminal of the integrated circuit from which is output a drive signal to the switching element, or to a current signal input external terminal into which is input a sense current signal that has detected the current flowing through the transformer or reactor, and the operation condition of the switching power supply device is set within an initialization period from immediately after the start of a supply of power to the integrated circuit until the on/off control of the switching element is started.

With the switching power supply device, generally, as a pull down resistor set to from 4.7 kΩ to 47 kΩ is provided so that the potential of the switching element gate terminal does not float when not controlled, the power supply condition is set in the internally provided condition setting circuit during the initialization period of the power supply control IC by adjusting the resistance value.

Also, as a filter circuit for removing noise is generally provided for the current signal input external terminal into which is input the sense current signal from the load, the filter resistor is taken to be the first resistor, and it is also possible to adjust the resistance value thereof.

Also, with an operation condition setting method of the invention, in a switching power supply device having a power supply control integrated circuit that controls a turning on and off of a switching element, wherein the switching element is disposed between an input power supply and a load, a constant output voltage is applied to the load by controlling the turning on and off of the switching element, and an operation condition of the switching power supply device is set within an initialization period from immediately after the start of a supply of power to the switching power supply device until the on/off control of the switching element is started.

The setting method includes a first step of outputting a predetermined current from an external terminal of the power supply control integrated circuit connected to a gate of the switching element, or from a current signal input external terminal into which is input a sense current signal that has detected the current flowing through the transformer or reactor, a second step of detecting the voltage of the external terminal, forming a condition indicating signal based on the result of the detection, and setting an operation condition of the switching power supply device in accordance with the condition indicating signal, and a third step of continuing to maintain the operation condition of the switching power supply device set based on the condition indicating signal after the initialization period has elapsed.

Advantage of the Invention

According to the invention, it is possible, without adding a dedicated condition setting terminal to a power supply control IC, to accurately set to a specific operation condition during an initialization period by selecting the resistance value of a resistor connected to the gate terminal of a switching element, or the resistance value of a filter resistor connected to an external terminal in order to remove noise, or the like. Also, there being no adverse effect on a normal operation, it is not necessary either to supply a large current to the exterior, as when utilizing the VCC pin decoupling capacitor in Japan Patent No. JP-A-2007-73954.

The heretofore described and other objects, characteristics, and advantages of the invention will be made clear in the following description related to the attached drawings representing embodiments preferred as examples of the invention.

BRIEF DESCRIPTION OF THE DRAWINGS

FIG. 13 is a diagram showing the number of operation conditions that can be set with condition indicating signals in the condition setting circuit shown in FIG. 11.

BEST MODE FOR CARRYING OUT THE INVENTION

Figure 1:
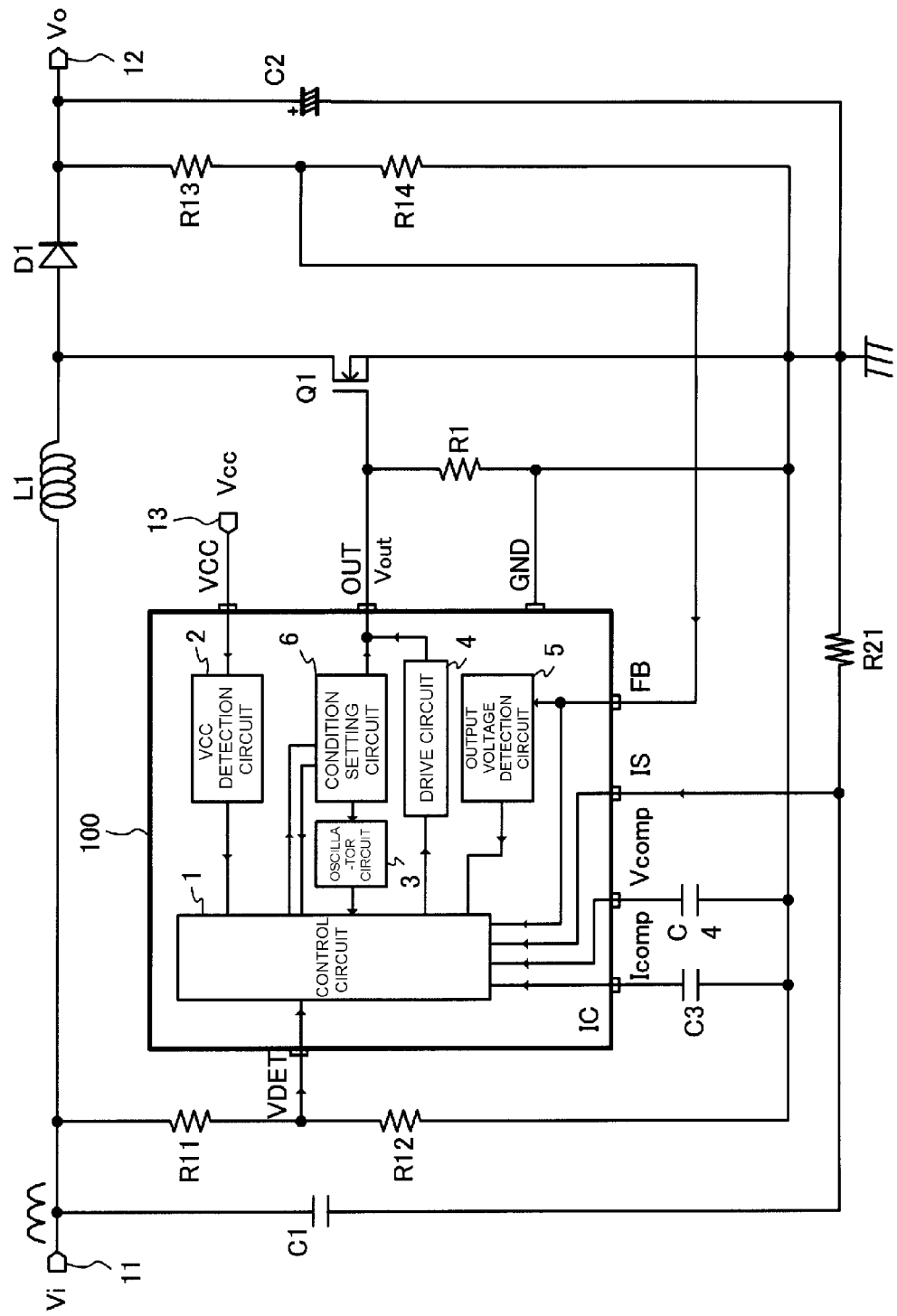
FIG. 1 is a circuit diagram showing an average current control switching power supply device according to Embodiment 1 of the invention.

Hereafter, referring to the drawings, a description will be given of embodiments of the invention.

Embodiment 1

Figure 15:
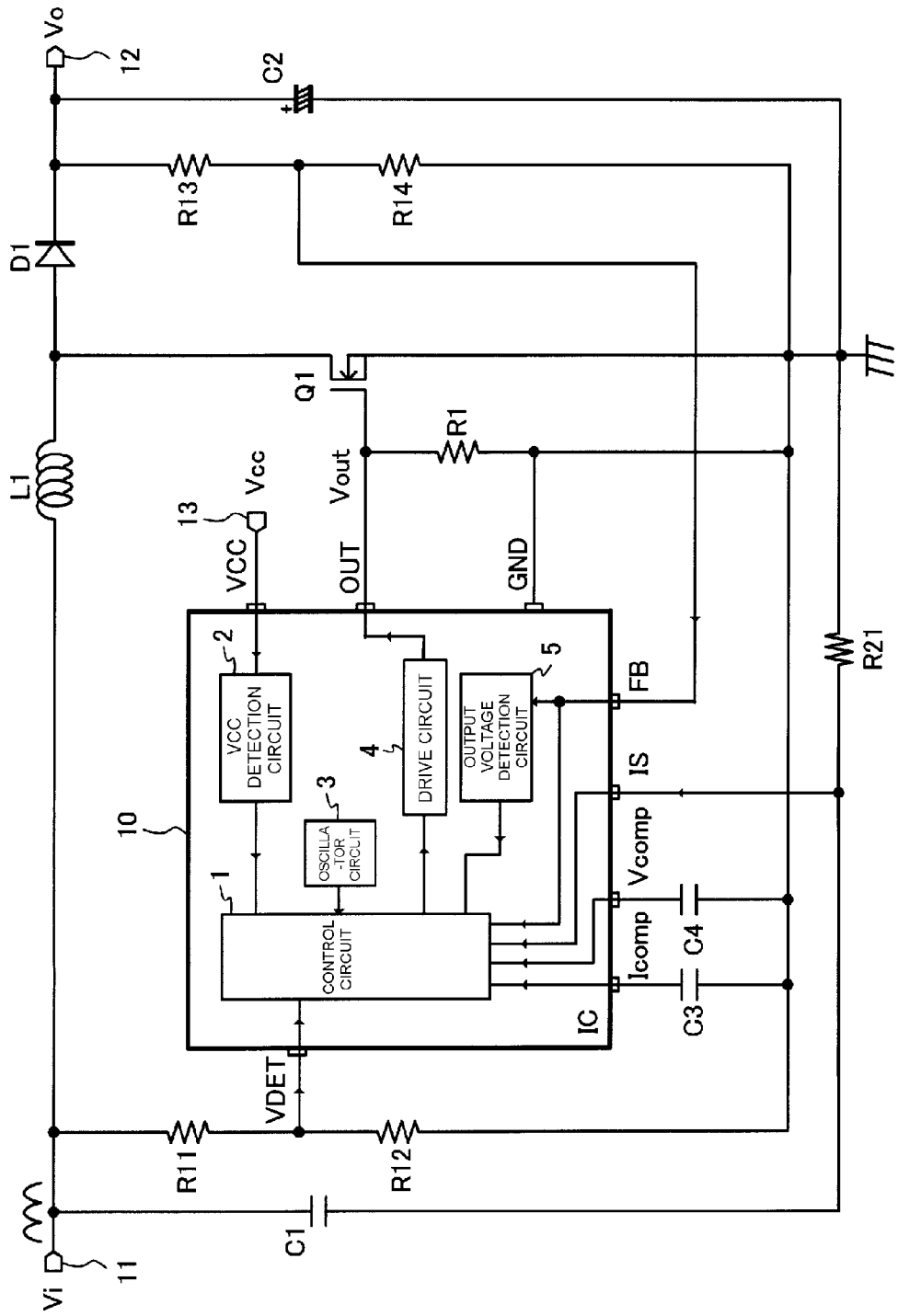
FIG. 15 is a circuit diagram showing a heretofore known average current control switching power supply device.

FIG. 1 is a circuit diagram showing an average current control switching power supply device according to Embodiment 1 of the invention. A point differing from a heretofore known device of FIG. 15 is that a condition setting circuit 6 is provided in a power supply control IC 100 that controls the switching power supply device. The condition setting circuit 6 is connected to an OUT terminal together with a drive circuit 4, and furthermore, functions in such a way as to control the oscillation frequency of an oscillator circuit 3 by exchanging a start signal and end signal, to be described later, with a control circuit 1.

Next, a description will be given of a specific configuration of the condition setting circuit 6.

Figure 2:
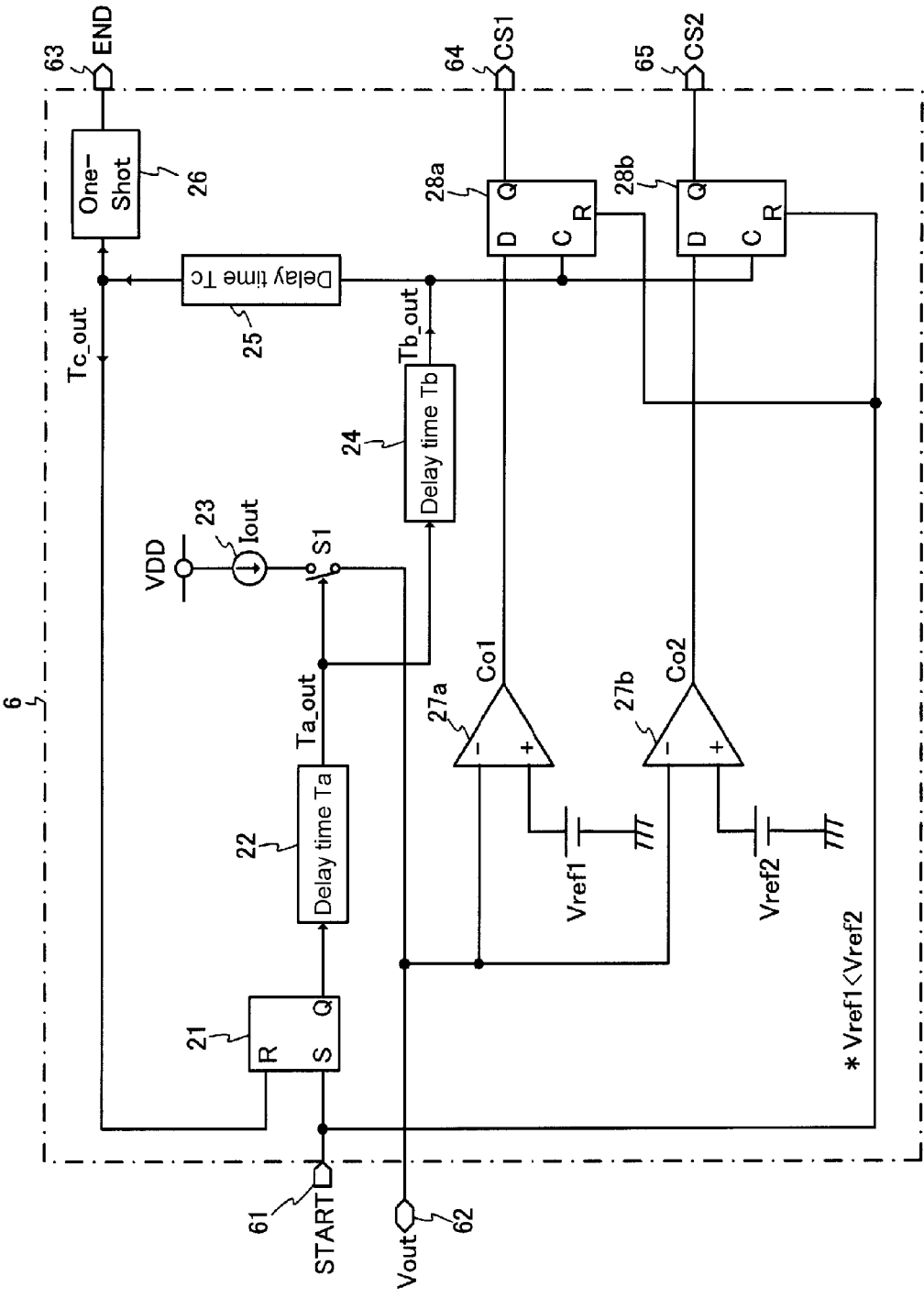
FIG. 2 is a circuit configuration diagram showing an example of a condition setting circuit used in Embodiments 1 to 5.

FIG. 2 is a circuit configuration diagram showing an example of the condition setting circuit used in Embodiment 1, and in Embodiments 2 to 5 to be described later. Hereafter, a description will be given of a case in which the condition setting circuit is used in Embodiment 1.

The condition setting circuit 6 includes a START terminal 61 into which a one-shot start signal START from the control circuit 1 is input, an input-output terminal 62, connected to a control output OUT terminal, into which a voltage Vout of the OUT terminal is input, and which is for outputting a constant current during an initialization period, an END terminal 63 that outputs an end signal END, and condition setting terminals 64 and 65 that output two condition indicating signals CS1 and CS2. The START terminal 61 is connected to a set terminal S of an RS flip-flop circuit 21, and an output terminal Q of the RS flip-flop circuit 21 is connected to a first delay circuit 22. In the first delay circuit 22, when a rise from L (low) to H (high) of a condition signal Q from the output terminal Q (for the sake of simplification, the terminal and signal are given the same reference sign) is input, an output signal Ta_out delayed by a time Ta is generated. As a decay from H to L of the condition signal Q is not delayed, when the condition signal Q becomes L, the output signal Ta_out also becomes L immediately. A constant current supply 23 connected to an internal power supply terminal VDD is connected to the input-output terminal 62 via a switch S1.

The output signal Ta_out of the first delay circuit 22, as well as causing the switch S1 to be switched on when the level of the output signal Ta_out is H, is an input signal of a second delay circuit 24. Then, in the second delay circuit 24, after the output signal Ta_out of the first delay circuit 22 is input, an output signal Tb_out delayed by a time Tb is generated. Also, the output signal Tb_out of the second delay circuit 24 is made an input signal of a third delay circuit 25 that generates an output signal further delayed by a time Tc, and an output signal Tc_out of the third delay circuit 25 is supplied to each of a one-shot circuit 26 and a reset terminal of the RS flip-flop circuit 21.

The power supply control IC 100 acts in such a way as to cause a constant current Iout to flow to the input-output terminal 62 via the switch 1 in the condition setting circuit 6 during the initialization period, and the constant current Iout is injected via the OUT terminal into a resistor R1 externally attached to the power supply control IC 100. Also, the drive circuit 4 is controlled by the control circuit 1, and the output has a high impedance for the period during which the constant current Iout during the initialization period is injected into the resistor R1. Then, the inverting input terminal of each of first and second comparators 27a and 27b is connected to the input-output terminal 62, and reference voltages Vref1 and Vref2 (note that Vref1<Vref2) are connected one to each non-inverting input terminal. Because of this, a configuration is such that the terminal voltage of the externally attached resistor R1 is compared with the two mutually differing reference voltages Vref1 and Vref2 in the first and second comparators 27a and 27b, and the comparison results are supplied as binary level (H or L) signals Co1 and Co2 to D input terminals of corresponding D-type flip-flop circuits 28a and 28b.

It being sufficient that the reference voltages Vref1 and Vref2 are generated in the condition setting circuit 6 of the power supply control IC 100, they can be set at, for example, 0.45V and 0.75V.

In the D-type flip-flop circuits 28a and 28b, the binary level signals Co1 and Co2 input into the D input terminals in advance are read in synchronization with a clock signal subsequently arriving at clock terminals C, that is, the output signal Tb_out of the second delay circuit 24, and output as the condition indicating signals CS1 and CS2 respectively from output terminals Q. Also, reset terminals R of the D type flip-flop circuits 28a and 28b are connected to the START terminal 61, receive a start signal from the control circuit 1 at the start of the power supply control IC 100 initialization period, and reset the internal condition set in the condition setting circuit 6.

In this way, in the power supply control IC 100, the oscillation frequency of the oscillator circuit 3 is determined by the condition indicating signals CS1 and CS2 output from the condition setting terminals 64 and 65 of the condition setting circuit 6, and the switching frequency of a switching element Q1 is set thereby. That is, the power supply control IC 100 is such that the drive circuit 4 connected to the OUT terminal of the power supply control IC 100 has a high impedance, and the constant current Iout from the constant current supply 23 is injected from the drive circuit 4 to the externally connected resistor R1. Then, the condition indicating signals CS1 and CS2 are determined by comparing the control voltage Vout occurring at the OUT terminal at this time with the reference voltages Vref1 and Vref2 set in the first and second comparators 27a and 27b. Consequently, by holding the condition indicating signals CS1 and CS2 in the D type flip-flop circuits 28a and 28b, the switching frequency for a subsequent normal operating condition is set, and the operating condition of the switching power supply device can continue to be maintained after the initialization period has elapsed.

The control voltage Vout occurring at the OUT terminal of the power supply control IC 100 during the initialization period can be determined as in the following Equation (1) by setting the resistor R1 to a resistance value of a predetermined size with respect to the constant current Iout.

$$Vout = Iout * R1 \qquad (1)$$

Herein, the control voltage Vout has to be of a voltage value at which the power MOSFET which is the switching element Q1 is not turned on. For this reason, when a minimum value Vth_min of a threshold voltage Vth at the gate terminal of the switching element Q1 is 2V, it is necessary to set a maximum value Vout_max of the control voltage Vout to be smaller than Vth_min at 1V. A maximum resistance value R1_max of the resistor R1 at this time is decided as in the following Equation (2). For example, when the constant current Iout is 50 μA, the maximum value of the resistor R1 is 20 kΩ.

$$R1\_max = Vout\_max/Iout \qquad (2)$$

Figure 3:
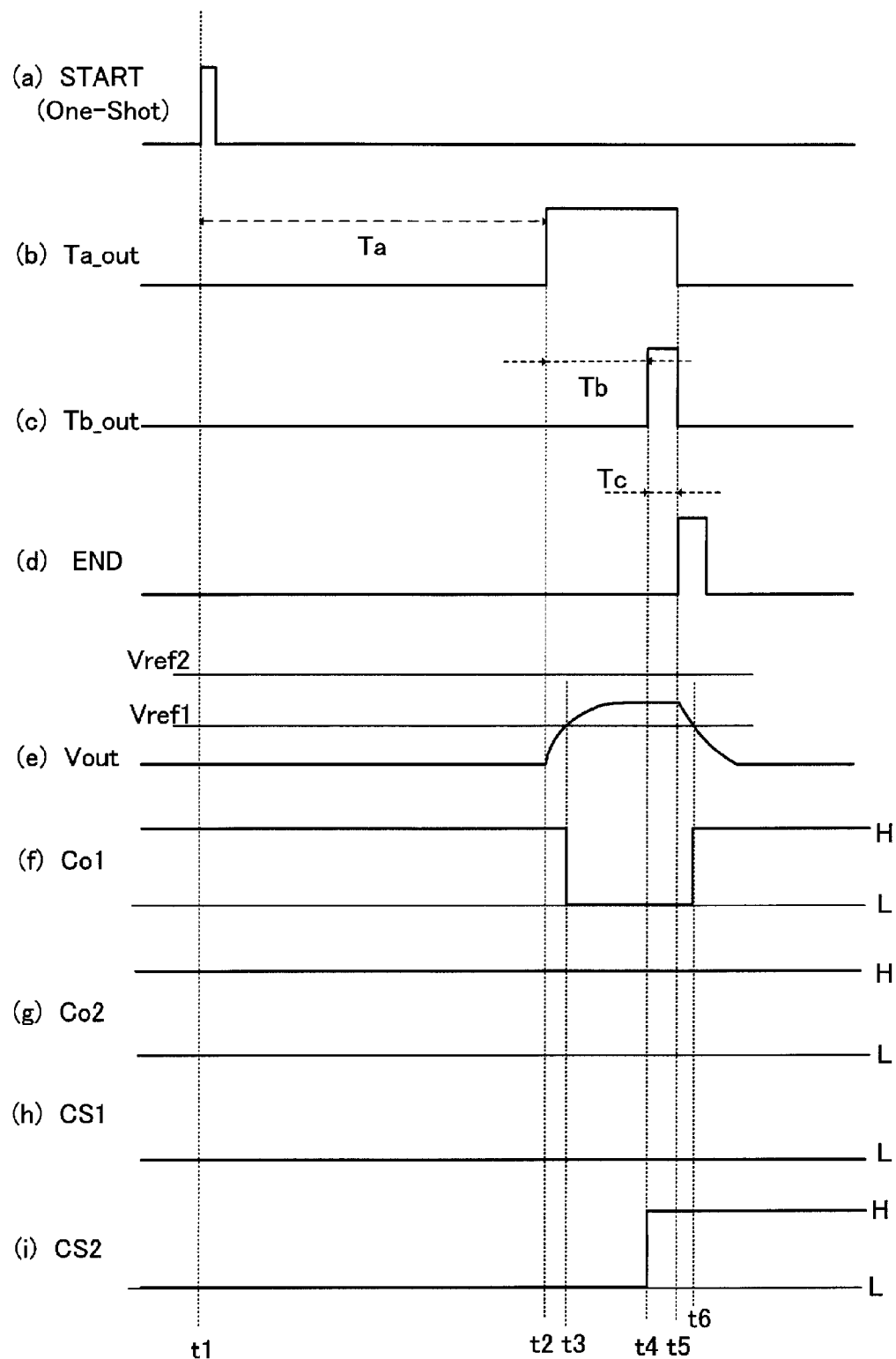
FIG. 3 is a time chart showing an example of each input-output signal condition of the condition setting circuit shown in FIG. 2.

FIG. 3 is a time chart showing an example of each input-output signal condition of the condition setting circuit shown in FIG. 2. (a) of the drawing is the start signal START input from the control circuit 1 into the condition setting circuit 6 at a time t1. The output signal Ta_out of the first delay circuit 22 and the output signal Tb_out of the second delay circuit 24 are shown in (b) and (c) of the drawing respectively. Also, the end signal END shown in (d) of the drawing is output from the condition setting circuit 6 to the control circuit 1 at a time t5 delayed by a time (Ta+Tb+Tc) from the time t1 at which the start signal START is input.

The voltage Vout of the input-output terminal 62 shown in FIG. 3 (e) (in this case, it is not the control voltage of the switching element Q1 output from the drive circuit 4, but the voltage according to Equation (1)) rises at a time t2 at which the injection of the constant current Iout from the constant current supply 23 into the resistor R1 starts, reaches the potential of the reference voltage Vref1 at a time t3, continues to rise after that too until the RS flip-flop circuit 21 is reset at the time t5, nearing the value of Equation (1) (in the event that there is no parasitic capacity including the gate capacity of the switching element Q1, the voltage Vout immediately reaches the value of Equation (1)). Consequently, the binary level signal Co1 shown in (f) of the drawing is at the L level, and the binary level signal Co2 shown in (g) of the drawing is at the H level, at a time t4 at which the output signal Tb_out of the second delay circuit 24 is supplied as a clock signal to the D type flip-flop circuits 28a and 28b. On the supply of the constant current Iout from the constant current supply 23 being stopped at the time t5, the voltage Vout starts to decrease, and the binary level signal Co1 changes to the H level when the voltage Vout reaches the potential of the reference voltage Vref1 at a time t6, but as this is not read into the D type flip-flop circuit 28a, the condition indicating signals CS1 and CS2 do not change.

A condition setting function starts by the start signal START being input from the control circuit 1 into the condition setting circuit 6 in this way, and by the end signal END being emitted from the condition setting circuit 6 to the control circuit 1 at a point at which a condition setting operation of the condition setting function finishes, the initialization period in the power supply control IC 100 finishes, and it is possible to put the switching power supply device into the normal operating condition. At this time, as it may happen that a rise in the gate voltage of the switching element Q1 occurs when a power supply input voltage Vi is applied, it is possible to make the delay time Ta in the first delay circuit 22 a delay time, for example 5 ms, that reflects a gate discharge time, taking into consideration a time constant based on the gate capacity of the power MOSFET, which is the switching element Q1, and the resistor R1. Also, it is possible to make the delay time Tb in the second delay circuit 24 a delay time, for example 1 ms, that reflects a charging time until the voltage Vout stabilizes, taking into consideration in the same way a time constant from the gate capacity of the power MOSFET, which is the switching element Q1, and the resistor R1, and the current value of the constant current Iout. Furthermore, the delay time Tc in the third delay circuit 25 is set as a time, for example 1 μs, for reading the condition indicating signals CS1 and CS2 into the oscillator circuit 3. The delay times Tb and Tc, in the same way as the delay time Ta, are each delayed with respect to a timing at which the input rises, but are not delayed with respect to a timing at which the input decays.

Figure 4:
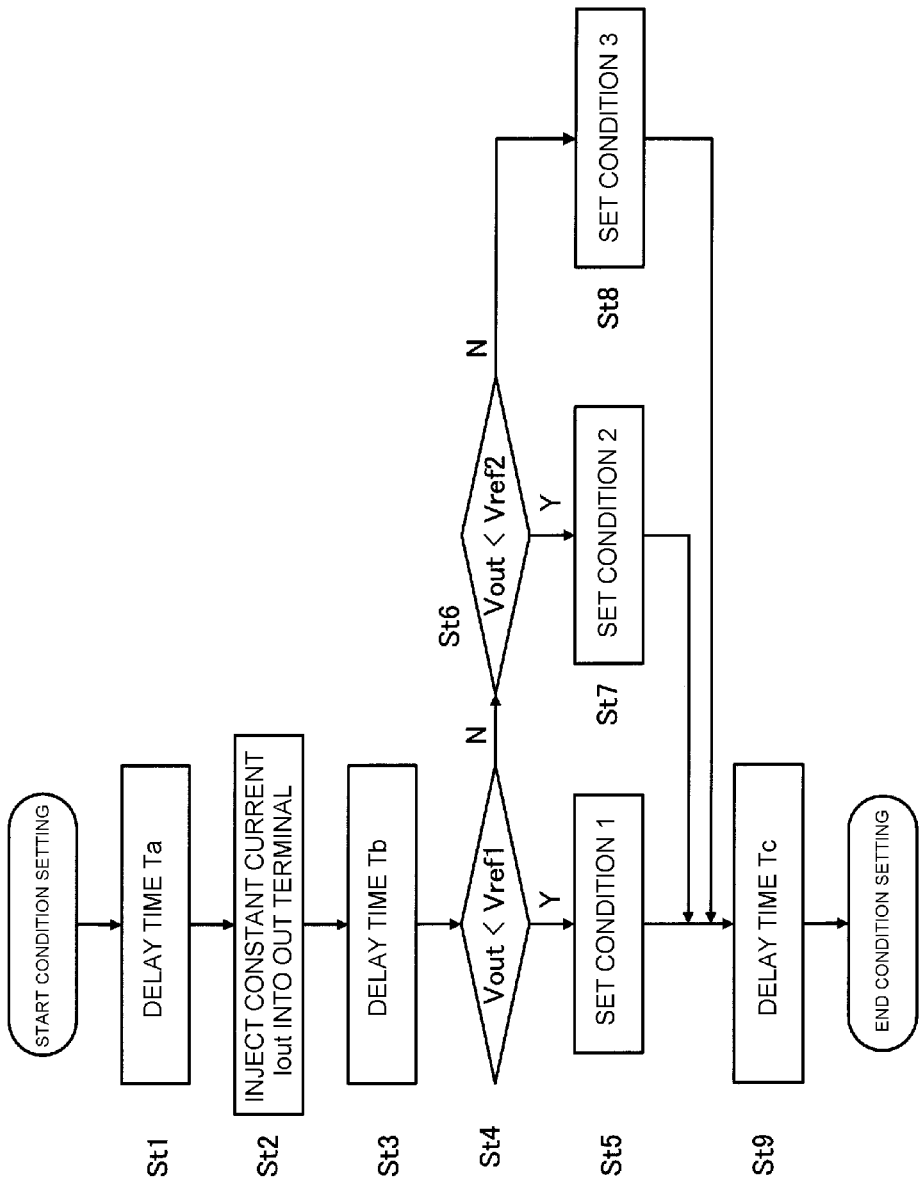
FIG. 4 is a flowchart showing an example of a setting operation in the condition setting circuit shown in FIG. 2.

FIG. 4 is a flowchart showing a setting operation in the condition setting circuit shown in FIG. 2.

In the condition setting circuit 6, when the start signal START from the control circuit 1 switches the RS flip-flop circuit 21 to a set condition, a condition signal Q is supplied from here to the first delay circuit 22, and that condition setting operation is started. In step St1, the output signal Ta_out of the first delay circuit 22 is output with the delay time Ta. As the switch S1, which receives the output signal Ta_out, is switched on in step St2, the constant current Iout starts to flow from the OUT terminal of the power supply control IC 100 via the input-output terminal 62 from the constant current supply 23. As the output signal Ta_out is also supplied to the second delay circuit 24 simultaneously with this, the operation proceeds to step St3, and when the delay time Tb has elapsed, the output signal Tb_out is output from the second delay circuit 24. At the point at which the delay time Tb has elapsed, the operation proceeds to step St4, and a comparison is made between the voltage value Vout of the resistor R1 externally attached to the power supply control IC 100 via the input-output terminal 62 and the reference voltage Vref1 of the first comparator 27a.

When it is determined in step St4 of FIG. 4 that the voltage value Vout of the resistor R1 is smaller than the reference voltage Vref1 of the first comparator 27a (Vout<Vref1), the operation proceeds to step St5, and a first condition setting indicated by the condition indicating signals CS1 and CS2, which are the condition signals of the D type flip-flop circuits 28a and 28b determined at that time, is implemented for the oscillator circuit 3. Also, when it is determined in step St4 that Vout>Vref1, the operation proceeds to step St6, and the voltage value Vout of the resistor R1 is compared with the reference voltage Vref2 of the second comparator 27b. As a result of this, when Vout<Vref2, the operation proceeds to step St7, and a second condition setting is implemented for the oscillator circuit 3 in the same way as in step St5, while when this is not the case (when it is determined that Vout>Vref2), the operation proceeds to step St8, and a third condition setting is implemented for the oscillator circuit 3 in the same way as in step St5.

In a final step St9, the elapsing of the delay time Tc in the third delay circuit 25, into which the output signal Tb_out is input, is awaited. As the delay time Tc is set as the reading time of the condition indicating signals CS1 and CS2 output from the two D type flip-flop circuits 28a and 28b, the end signal END is output from the one-shot circuit 26 via the END terminal 63 to the control circuit 1 in response to the output signal Tc_out of the delay time Tc.

Herein, a description has been given of a case in which three kinds of operating conditions are set by comparing the two reference voltages Vref1 and Vref2 with the voltage value Vout of the resistor R1, but operating conditions that can be set in the invention are not limited to three kinds. Generally, in order to establish N operating conditions in the switching power supply device, N−1 reference voltages and pairs of comparators, or A/D converters, are necessary.

Figure 5:
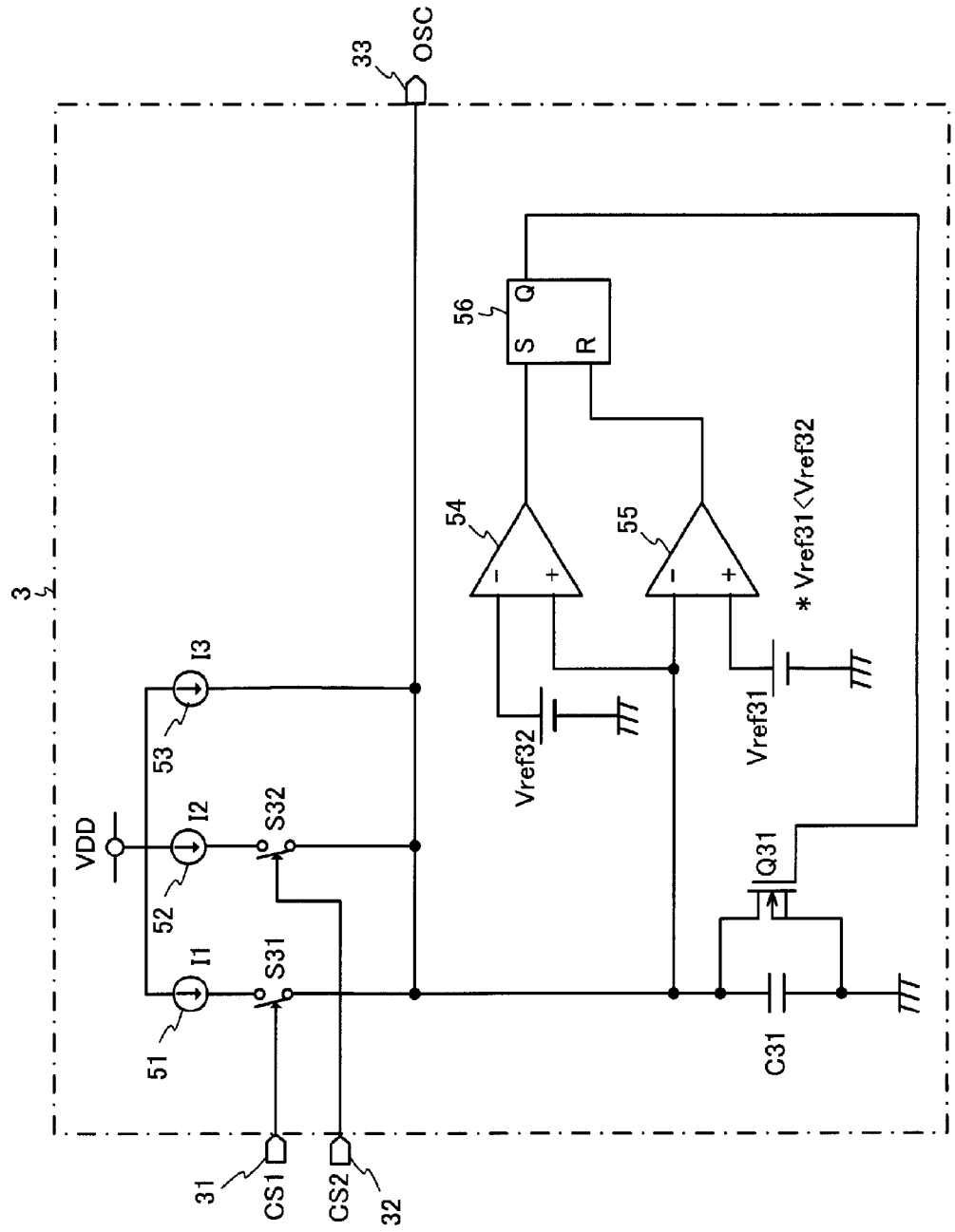
FIG. 5 is a circuit configuration diagram showing an example of an oscillator circuit that sets the switching frequency of a switching element.

FIG. 5 is a circuit configuration diagram showing an example of an oscillator circuit that sets the switching frequency of the switching element.

The oscillator circuit 3 is configured of a capacitor C31 chargeable with three constant current sources 51, 52, and 53, switches S31 and S32 for changing the charging current, a transistor Q31 for discharging the capacitor C31, third and fourth comparators 54 and 55 that compare the charging voltage of the capacitor C31 with mutually differing reference voltages Vref31 and Vref32, and an RS flip-flop circuit 56. The constant current sources 51, 52, and 53 output constant currents of sizes I1, I2, and I3 respectively, input terminals 31 and 32 are connected to the condition setting terminals 64 and 65 of the heretofore described condition setting circuit 6, and an oscillation signal OSC is output from an output terminal 33 to the control circuit 1 by the oscillator circuit 3 being caused to operate at an oscillation frequency in accordance with the level of the condition indicating signals CS1 and CS2. The switches S31 and S32 are on (conductive) when the level of the condition indicating signals CS1 and CS2 respectively is H, and off (shut off) when the level is L.

Next, a description will be given of an oscillation action of the oscillator circuit 3.

Figures 6, 7:
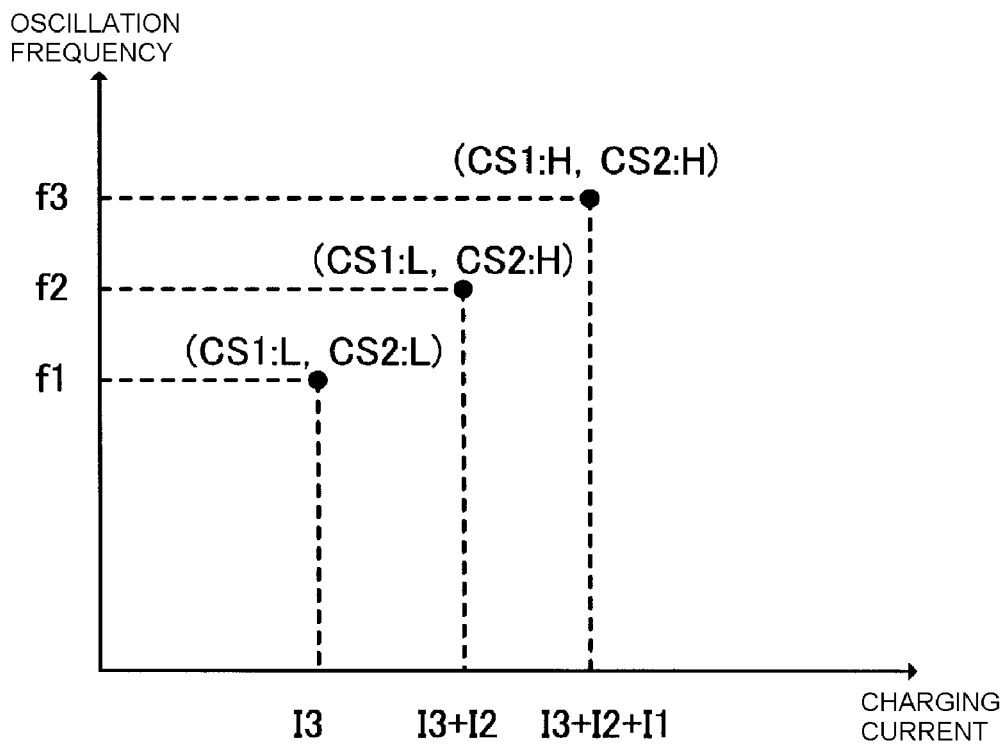
FIG. 6 is a diagram showing oscillation frequencies decided by condition indicating signals and charging currents in the oscillator circuit shown in FIG. 5.
FIG. 7 is a diagram showing an example of oscillation frequencies selectable in the oscillator circuit shown in FIG. 5.

FIG. 6 is a diagram showing oscillation frequencies decided by the condition indicating signals and charging currents in the oscillator circuit shown in FIG. 5. When the condition indicating signal CS1 input from the input terminal 31 is at the L level, and when the condition indicating signal CS2 input from the input terminal 32 is at the H level, the switch S31 is switched off, the switch S32 is switched on, and a charging current to the capacitor C31 flows at a size of I2+I3.

Herein, for example, when setting the constant currents I1, I2, and I3 at 1.0 μA, 1.0 μA, and 5.0 μA, the capacity value of the capacitor C31 at 28.5 pF, and the reference voltages Vref31 and Vref32 at 0.5V and 4.0V respectively, it is possible to select any one of oscillation frequencies f1=50 kHz, f2=60 kHz, and f3=70 kHz in the oscillator circuit 3.

FIG. 7 is a diagram showing an example of oscillation frequencies selectable in the oscillator circuit shown in FIG. 5. Herein, a relationship between the resistance value of the resistor R1 used and the oscillation frequency is shown for set conditions 1 to 3.

According to the invention heretofore described as the Embodiment 1, it is possible to provide a switching power supply device wherein, by adjusting the resistance value of the resistor R1 connected between the OUT terminal and the ground during the initialization period of the switching power supply, it is possible to select the oscillation frequency in the oscillator circuit 3, and set the operating condition thereof.

The operation condition setting method of the invention not being limited only to the setting of the oscillation frequency of the oscillator circuit 3, it can also be utilized in the setting of other operation conditions, such as setting an overvoltage protection (OVP) level or setting an overcurrent protection (OCP) level, by setting the levels of the condition indicating signals CS1, CS2, (CS3, . . . ) utilizing the resistor R1 of the OUT terminal during the initialization period. Furthermore, it is also possible to select whether to respond with a latch mode or a restart mode when there is an overload, and choose a fixed frequency mode or a variable frequency mode.

Embodiment 2

Figure 8:
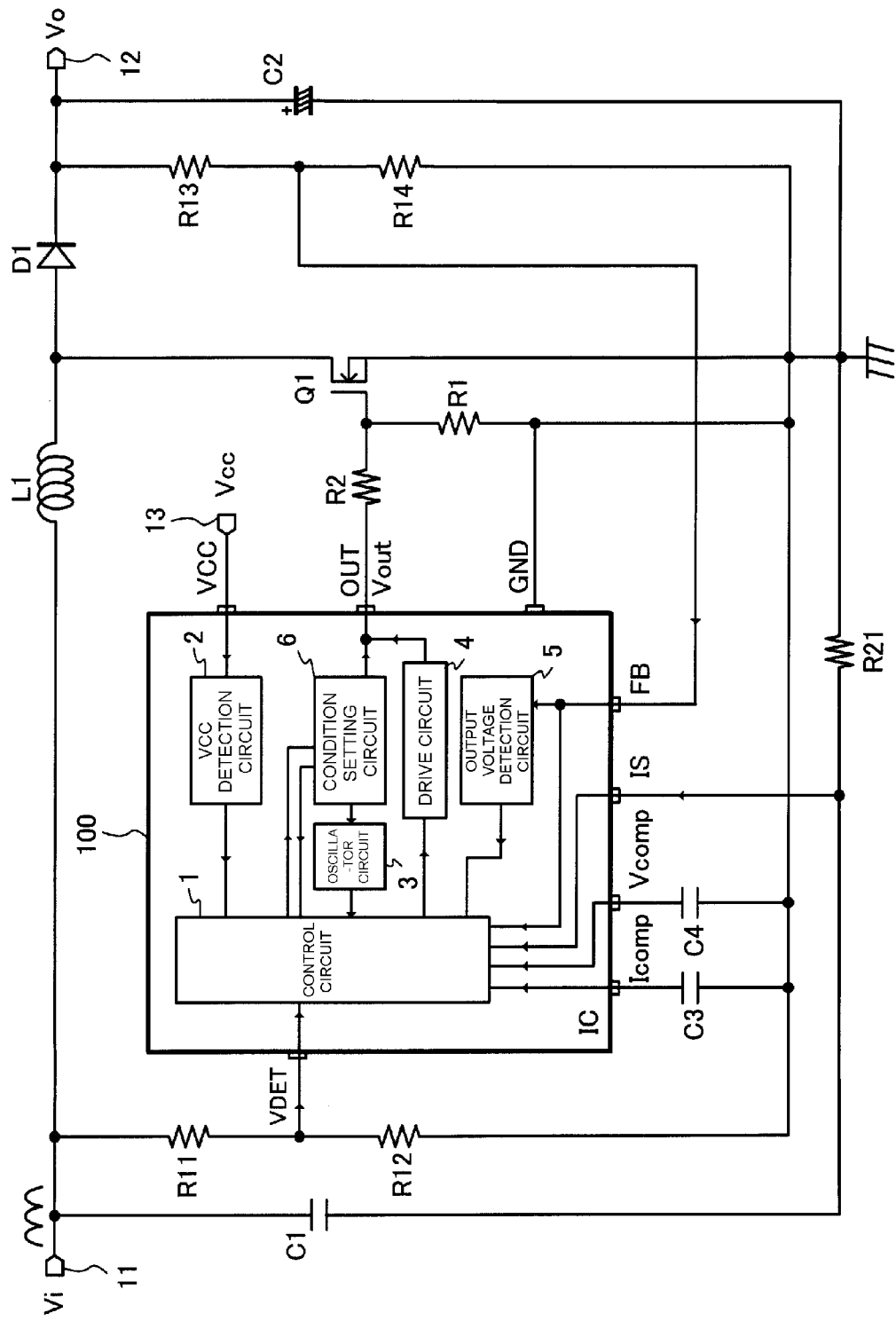
FIG. 8 is a circuit diagram showing a switching power supply device according to Embodiment 2 of the invention.

FIG. 8 is a circuit diagram showing a switching power supply device according to Embodiment 2 of the invention.

In Embodiment 2, a point differing from the switching power supply device of the heretofore described Embodiment 1 is that a resistor R2 with a resistance value of, for example, 22Ω is interposed between the OUT terminal of the power supply IC 100 and the gate terminal of the switching element Q1 connected to the OUT terminal. It is possible to adjust a drive current to the switching element Q1 with the resistor R2. The voltage Vout in the initialization period in this case is determined as in the following Equation (3) by setting each of the resistors R1 and R2 to a resistance value of a predetermined size with respect to the constant current Iout.

$$Vout=Iout*(R1+R2) \quad (3)$$

Embodiment 3

Figure 9:
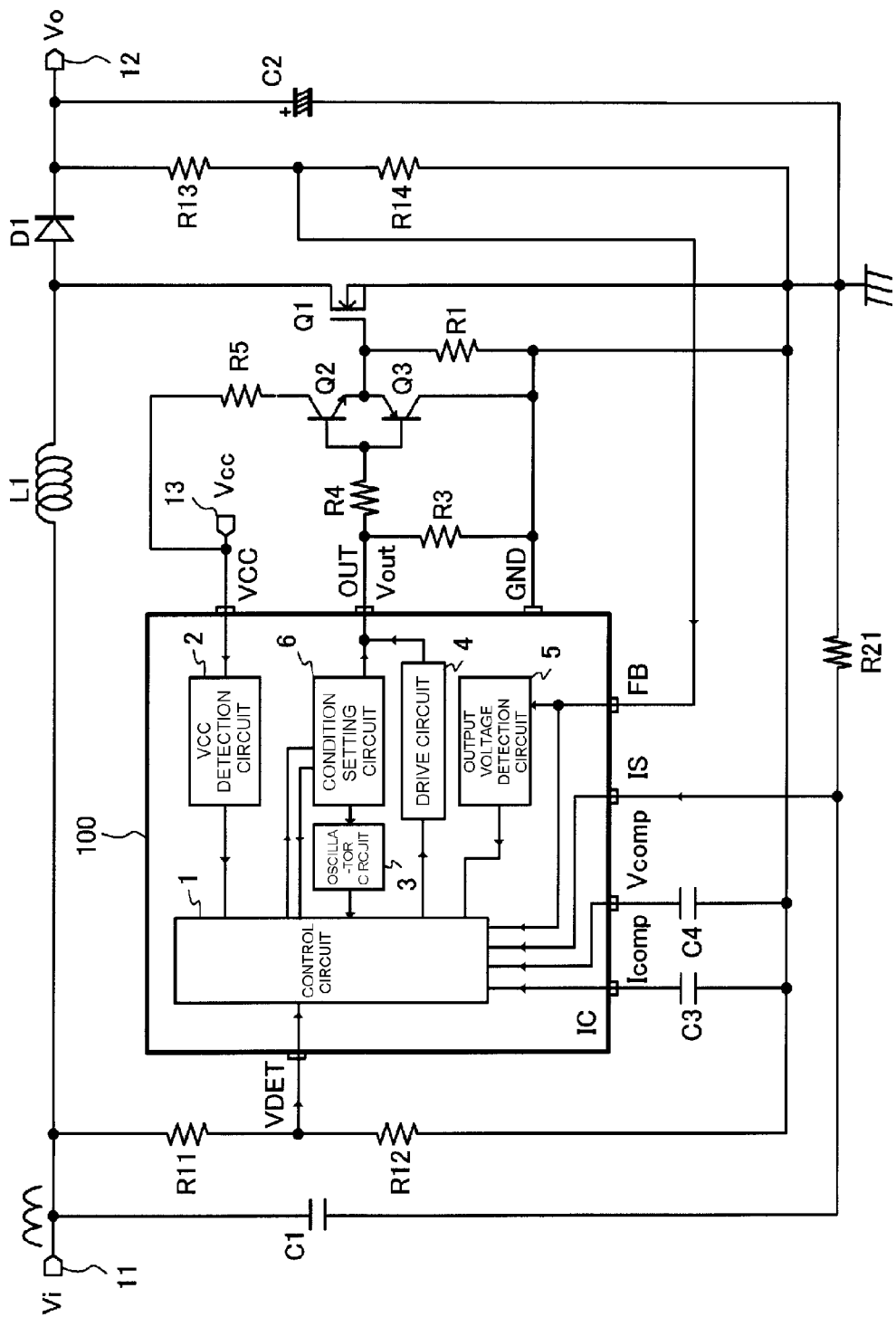
FIG. 9 is a circuit diagram showing a switching power supply device according to Embodiment 3 of the invention.

FIG. 9 is a circuit diagram showing a switching power supply device according to Embodiment 3 of the invention.

In Embodiment 3, a point differing from the switching power supply devices of the heretofore described Embodiments 1 and 2 is that a buffer circuit configured of switching elements Q2 and Q3 is inserted between the OUT terminal of the power supply control IC 100 and the gate terminal of the switching element Q1. Because of this, drive capability for the switching element Q1 is strengthened, and it is possible to supplement a deficiency in the drive capability of the power supply control IC 100. The voltage Vout in this case is determined as in the following Equation (4) by setting the resistor R3 to a resistance value of a predetermined size with respect to the constant current Iout.

$$Vout=Iout*R3 \quad (4)$$

Embodiment 4

Figure 10:
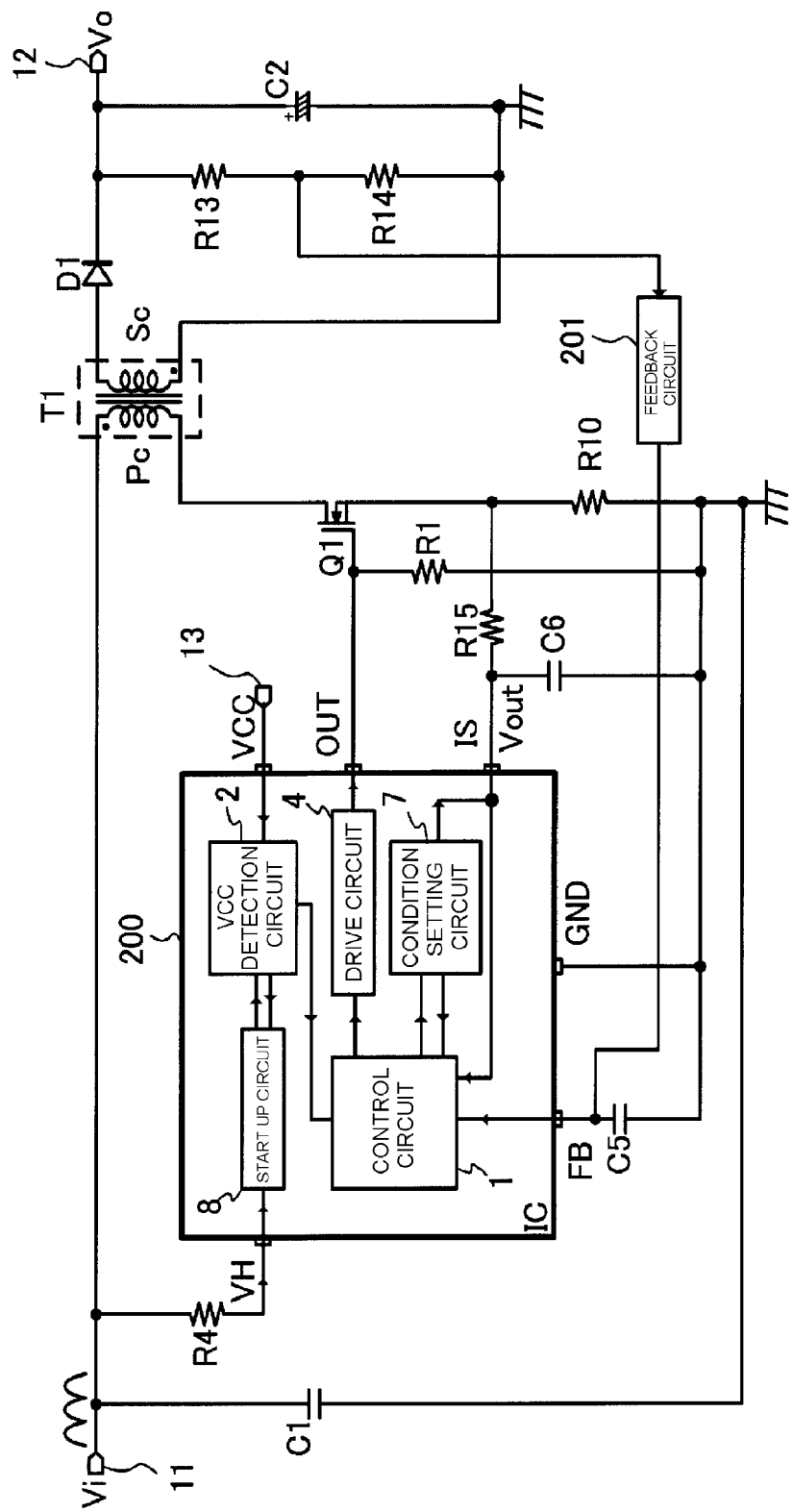
FIG. 10 is a circuit diagram showing a switching power supply device according to Embodiment 4 of the invention.

FIG. 10 is a circuit diagram showing a switching power supply device according to Embodiment 4 of the invention. In this switching power supply device, an input terminal 11 and an output terminal 12 are joined by a flyback transformer T1, one end of a primary coil Pc thereof is connected to the drain terminal of the switching element Q1, which is an N-channel type power MOSFET or the like, and the source terminal of the switching element Q1 is grounded via a current detecting shunt resistor R10. One end of a secondary coil Sc of the flyback transformer T1 is connected via a diode D1 to the output terminal 12, and the other end of the secondary coil Sc is grounded. Also, a connection point of the diode D1 and output terminal 12 is grounded via a capacitor C2, and a rectifying and smoothing circuit is configured of the diode D1 and capacitor C2.

The switching power supply device is configured in such a way that it is controlled by a power supply control IC 200 to apply a constant output voltage Vo to a load, and when the input power supply voltage Vi is supplied to the input terminal 11, the switching element Q1 disposed between the input power supply voltage Vi and the load is on/off controlled by the control voltage Vout. The power supply control IC 200 includes, as well as the control circuit 1, a VCC detection circuit 2, the drive circuit 4, a condition setting circuit 7, a start up circuit 8, and the like, inside the power supply control IC 200. Also, the power supply control IC 200 includes the control output OUT terminal, a power supply input VCC terminal, a VH terminal for supplying power to the power supply control IC 200 when starting up (and for detecting the voltage of the input power supply voltage Vi), an FB terminal into which is input a feedback signal from a voltage feedback system including a feedback circuit 201, a ground connection GND terminal current, and an IS terminal into which is input a sense current signal that has detected the current flowing through the primary coil Pc of the flyback transformer T1. Although it is also possible to apply this embodiment to, for example, the kind of non-isolated type switching power supply device shown in FIG. 15, in this case, the IS terminal is a terminal into which is input a sense current signal that has detected the current flowing through a reactor L1.

In this kind of switching power supply device, the OUT terminal, as well as being grounded via the resistor R1, is connected to the gate terminal of the switching element Q1, and controls the turning on and off of the switching element Q1 in accordance with a control voltage output from the gate terminal. A power supply voltage is supplied to the VCC terminal from a power supply terminal 13. The VH terminal is connected to the input terminal 11 via a resistor R4. The FB terminal, as well as being grounded via a capacitor C5, is connected via the feedback circuit 201 to a connection point of resistors R13 and R14 serially connected between the output terminal 12 and the ground. The IS terminal, as well as being grounded via a capacitor C6, is connected via a resistor R15 to a connection point of the source terminal of the switching element Q1 and the shunt resistor R10. The same reference numerals and signs are given to portions corresponding to those of FIG. 1 showing Embodiment 1, and a description thereof will be omitted.

In the power supply control IC 200 of the switching power supply device of FIG. 10, a point differing from a power supply control IC 10 of the heretofore known device of FIG. 15 is that the condition setting circuit 7 is provided. Then, the condition setting circuit 7 is connected to the current detecting IS terminal, and detects the voltage Vout wherein the voltage across the shunt resistor R10 is smoothed by an RC filter formed of the resistor R15 and capacitor C6. Also, the condition setting circuit 7, by exchanging a start signal and end signal with the control circuit 1, functions in such a way as to set the switching power supply device to one of a plurality of selectable operation conditions within an initialization period from immediately after the start of a supply of power to the power supply control IC 200 until an on/off control of the switching element Q1 is started.

Figure 11:
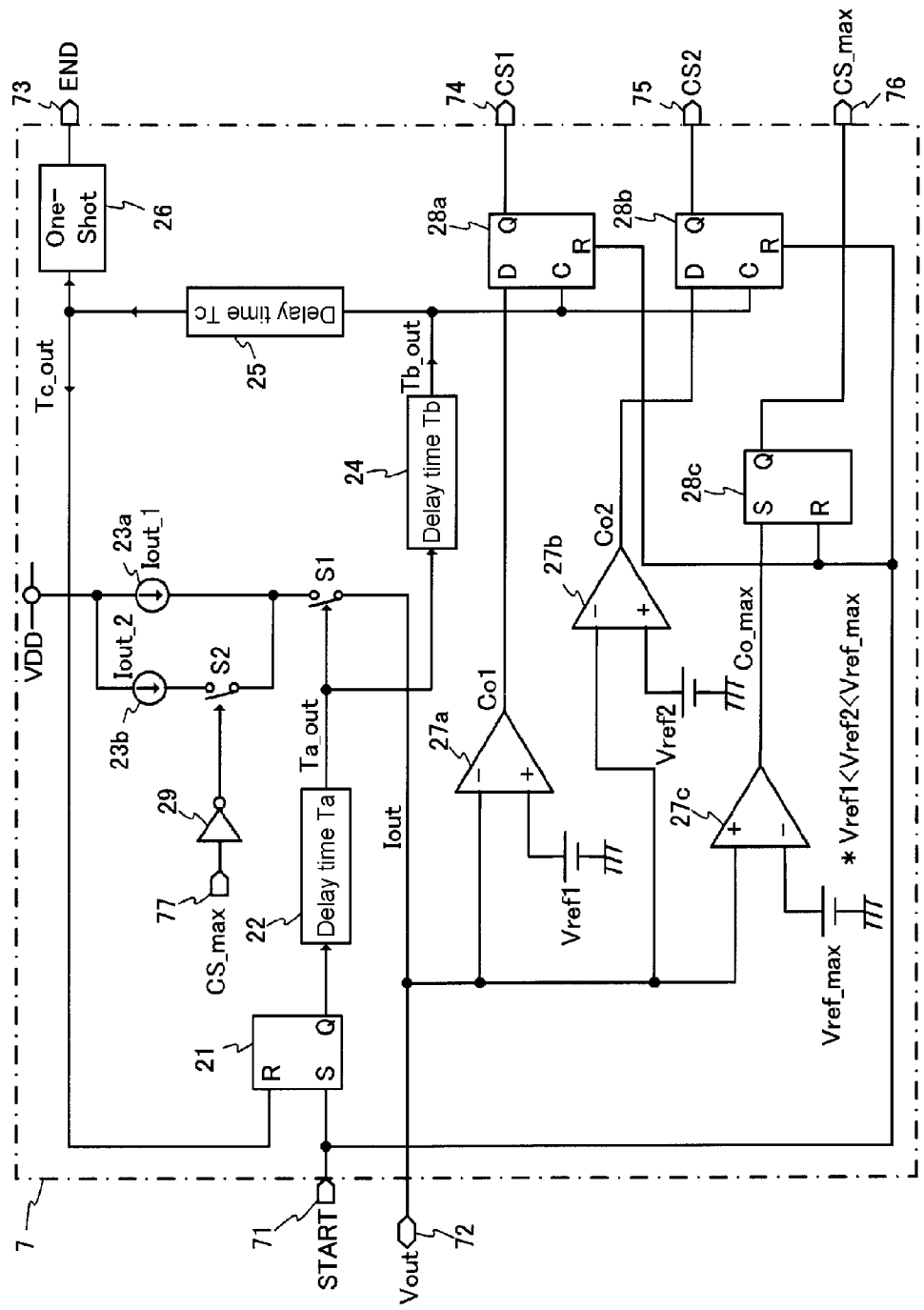
FIG. 11 is a circuit configuration diagram showing an example differing from that of FIG. 2 of a condition setting circuit used in Embodiments 1 to 5.

FIG. 11 is a circuit configuration diagram showing an example differing from that of FIG. 2 of a condition setting circuit used in Embodiments 1 to 4, and in Embodiment 5 to be described later. Hereafter, a description will be given of a case in which the condition setting circuit is used in Embodiment 4.

The condition setting circuit 7 includes a START terminal 71 into which the one-shot start signal START from the control circuit 1 is input, an input-output terminal 72, connected to the current detecting IS terminal, into which the voltage Vout generated at the IS terminal is input, and which is for outputting a constant current during the initialization period, an END terminal 73 that outputs the end signal END, and condition setting terminals 74, 75, and 76 that output three condition indicating signals CS1, CS2, and CS_max. The START terminal 71 is connected to the set terminal S of the RS flip-flop circuit 21, and the output terminal Q of the RS flip-flop circuit 21 is connected to the first delay circuit 22. In the first delay circuit 22, when a rise from L (low) to H (high) of the condition signal Q from the output terminal Q (for the sake of simplification, the terminal and signal are given the same reference symbol) of the RS flip-flop circuit 21 is input, the output signal Ta_out delayed by the time Ta is generated.

As a decay from H to L of the condition signal Q is not delayed, when the condition signal Q becomes L, the output signal Ta_out also becomes L immediately. Two constant current supplies 23a and 23b are connected in parallel to the internal power supply terminal VDD, the constant current supply 23a is connected to the input-output terminal 72 via the switch S1, and it is possible to output a constant current Iout_1 to the input-output terminal 72. Also, the constant current supply 23b is connected to the input-output terminal 72 via the switches S2 and S1 in series, and on being connected, a current wherein a constant current Iout_2 is added to the constant current Iout_1 is output via the input-output terminal 72 to the IS terminal.

The output signal Ta_out of the first delay circuit 22, as well as causing the switch S1 to be switched on when the level of the output signal Ta_out is H, is also an input signal of the second delay circuit 24. Then, in the second delay circuit 24, after the output signal Ta_out of the first delay circuit 22 is input, the output signal Tb_out delayed by the time Tb is generated. Also, the output signal Tb_out of the second delay circuit 24 is made an input signal of the third delay circuit 25 that generates an output signal further delayed by the time Tc, and the output signal Tc_out of the third delay circuit 25 is supplied to each of the one-shot circuit 26 and the reset terminal of the RS flip-flop circuit 21.

First, second, and third comparators 27a, 27b, and 27c are connected to the input-output terminal 72, and the outputs of the comparators 27a, 27b, and 27c are input into the input terminals of D type flip-flop circuits 28a and 28b and an RS flip-flop circuit 28c respectively. Also, a condition signal Q (a condition indicating signal CS_max) of the RS flip-flop circuit 28c is supplied to an inverter circuit 29, and the switch S2 is configured in such a way that a switching on and off are controlled by the condition indicating signal CS_max inverted in the inverter circuit 29.

Herein, the input-output terminal 72 is connected to the inverting input terminals of the first and second comparators 27a and 27b and the non-inverting input terminal of the third comparator 27c. Also, reference voltages Vref1, Vref2, and Vref_max (note that Vref1<Vref2<Vref_max) are connected to the non-inverting input terminals of the first and second comparators 27a and 27b and the inverting input terminal of the third comparator 27c respectively. Because of this, a configuration is such that the voltage Vout is compared with the three mutually differing reference voltages Vref1, Vref2, and Vref_max in the first, second, and third comparators 27a, 27b, and 27c, and the comparison results are supplied as binary level (H or L) signals Co1, Co2, and Co_max to the input terminals of the corresponding flip-flop circuits 28a, 28b, and 28c.

In the D-type flip-flop circuits 28a and 28b, the binary level signals Co1 and Co2 input into the D input terminals in advance are read in synchronization with a clock signal subsequently arriving at the clock terminals C, that is, the output signal Tb_out of the second delay circuit 24, and output as the condition indicating signals CS1 and CS2 respectively from the output terminals Q. Also, reset terminals R of the D type flip-flop circuits 28a and 28b and RS flip-flop circuit 28c are connected to the START terminal 71 and, by the D type flip-flop circuits 28a and 28b and RS flip-flop circuit 28c being reset on receiving a start signal from the control circuit 1 at the start of the power supply control IC 200 initialization period, the internal condition of the power supply control IC 200 set by the condition setting circuit 7 is reset.

Subsequently, values of the condition indicating signals CS1, CS2, and CS_max output from the condition setting terminals 74, 75, and 76 of the condition setting circuit 7 are determined by an operation described hereafter, and operation conditions, such as the oscillation frequency of the oscillator circuit 3, relating to the power supply control IC 200 are set thereby.

Firstly, a final value of the control voltage Vout occurring at the IS terminal of the power supply control IC 200 during the initialization period is determined as in the following Equation (5) by setting the resistors R10 and R15 to a resistance value of a predetermined size with respect to the constant current Iout. However, owing to the existence of the externally attached capacitor C6, the resistance value is not reached instantly even when the constant current Iout is applied to the resistors R10 and R15, and the same kind of transient response as in a CR time constant circuit is exhibited.

$$Vout=Iout*(R10+R15) \quad (5)$$

The condition setting circuit 7 can control the current Iout injected into the input-output terminal 72 to differing sizes of (Iout1+Iout2) or Iout1 by the switches S1 and S2 being operated during the initialization period. Then, the constant current Iout is injected via the IS terminal into the serial resistors (R10+R15) externally attached to the power supply control IC 200. That is, as it is possible, by configuring the size of the current injected into the IS terminal of the power supply control IC 200 so as to be switchable within the initialization period, to determine the condition indicating signals with the output voltage Vout at the IS terminal and the size of the current injected into the IS terminal as two parameters, it is possible to increase the number of conditions that can be set. Consequently, even when there is a limit to the maximum value of the resistance value of the externally attached resistor, as with the resistor R1 in Embodiment 1 shown in FIG. 1, it is possible to set more conditions by this kind of switching of the injected current Iout.

It is preferable to add a discharge circuit to capacitor C6, which configures a filter capacitor of the IS terminal, so that no voltage remains in the IS terminal after condition setting.

Figure 12:
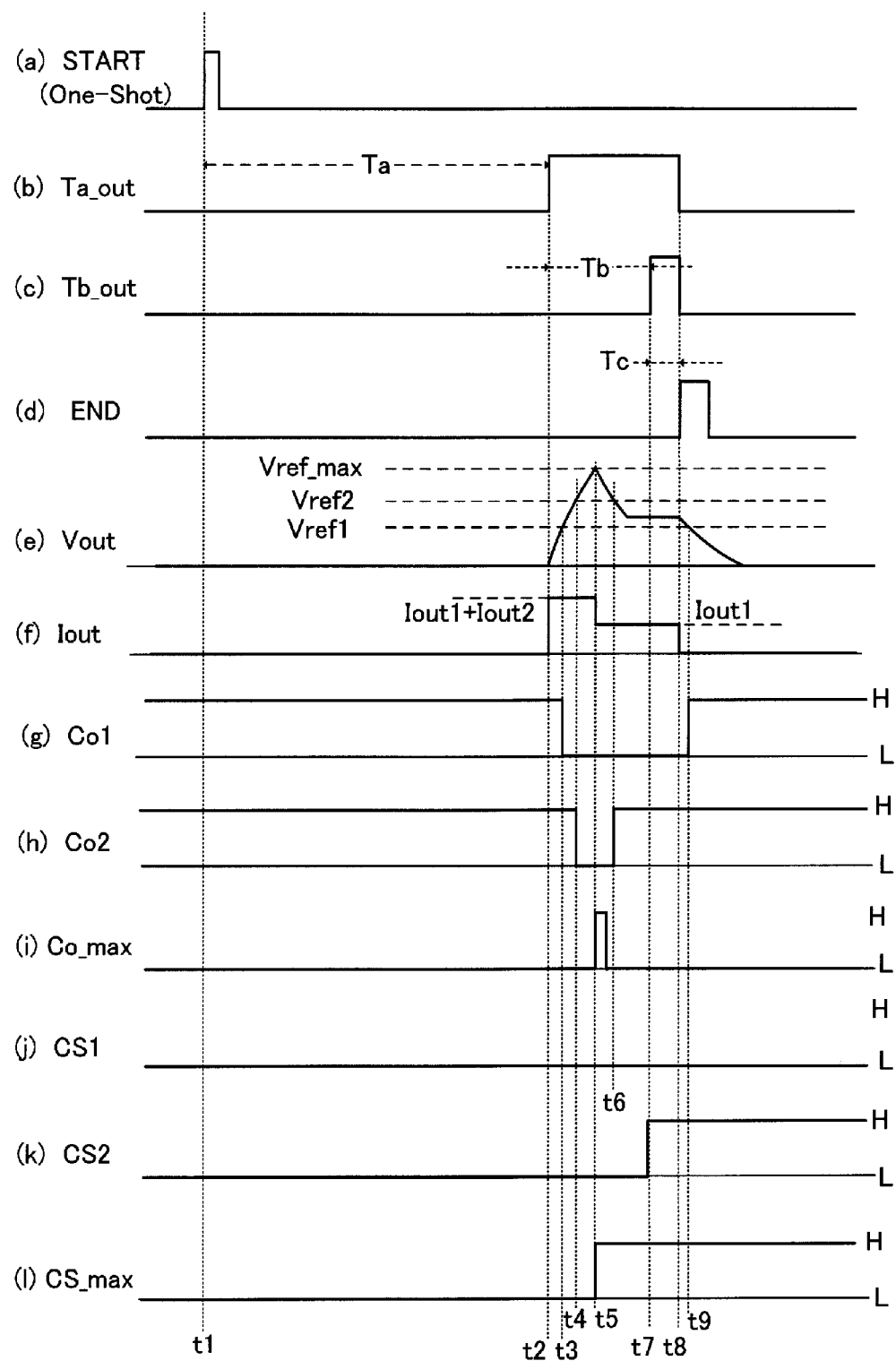
FIG. 12 is a time chart showing an example of each signal condition of the condition setting circuit shown in FIG. 11.

FIG. 12 is a time chart showing an example of each signal condition of the condition setting circuit shown in FIG. 11. (a) of the drawing is the start signal START input from the control circuit 1 into the condition setting circuit 7 at the time t1. The output signal Ta_out of the first delay circuit 22 and the output signal Tb_out of the second delay circuit 24 are shown in (b) and (c) of the drawing respectively. Also, the end signal END shown in (d) of the drawing is output from the condition setting circuit 7 to the control circuit 1 at a time t8 delayed by a time (Ta+Tb+Tc) from the time t1 at which the start signal START is input.

The voltage Vout of the input-output terminal 72 is shown in (e) of the drawing, and the output current Iout in (f) of the drawing. The voltage Vout exhibits a transient response approaching the voltage of Equation (5), rises at the time t2 at which the injection of the constant current Iout1+Iout2 from the constant current supplies 23a and 23b into the resistors R10 and R15 starts, reaches the potential of the reference voltage Vref1 at the time t3, and the potential of the reference voltage Vref2 at the time t4. Subsequently, the voltage Vout of the input-output terminal 72 continues to rise until the time t5, and when it reaches the reference voltage Vref_max, the RS flip-flop circuit 28c is set, and the binary level signal Co_max changes to the H level. Because of this, the output of the inverter circuit 29 becomes L, the switch S2 is switched off, and the current Iout decreases from Iout1+Iout2 to Iout1. For this reason, the voltage Vout also decreases, and steadies down to a potential between the reference voltage Vref1 and the reference voltage Vref2 by a time t7.

Consequently, the binary level signal Co1 shown in (g) of the drawing is at the L level, and the binary level signal Co2 shown in (h) of the drawing is at the H level, at the time t7 at which the output signal Tb_out of the second delay circuit 24 is supplied as a clock signal to the D type flip-flop circuits 28a and 28b. On the supply of the constant current Iout from the constant current supplies 23a and 23b being stopped at the time t8, the voltage Vout starts to decrease, and the binary level signal Co1 changes to the H level when the voltage Vout reaches the potential of the reference voltage Vref1 at a time t9, but as this is not read into the D type flip-flop circuit 28a, the condition indicating signals CS1, CS2, and CS_max do not change. When the set resistance value of the resistors R10 and R15 is small, the voltage Vout does not reach the reference voltage Vref_max, and the binary level signal Co_max changes to the L level with the current Iout still at Iout1+Iout2.

A condition setting function starts by the start signal START being input from the control circuit 1 into the condition setting circuit 7 in this way, and by the end signal END being emitted from the condition setting circuit 7 to the control circuit 1 at a point at which a condition setting operation of the condition setting function finishes, the initialization period in the power supply control IC 200 finishes, and it is possible to put the switching power supply device into the normal operating condition.

FIG. 13 is a diagram showing the number of operation conditions that can be set with the condition indicating signals in the condition setting circuit shown in FIG. 11. Herein, it is possible to set six types of operation condition with the three condition indicating signals CS1, CS2, and CS_max.

Embodiment 5

Figure 14:
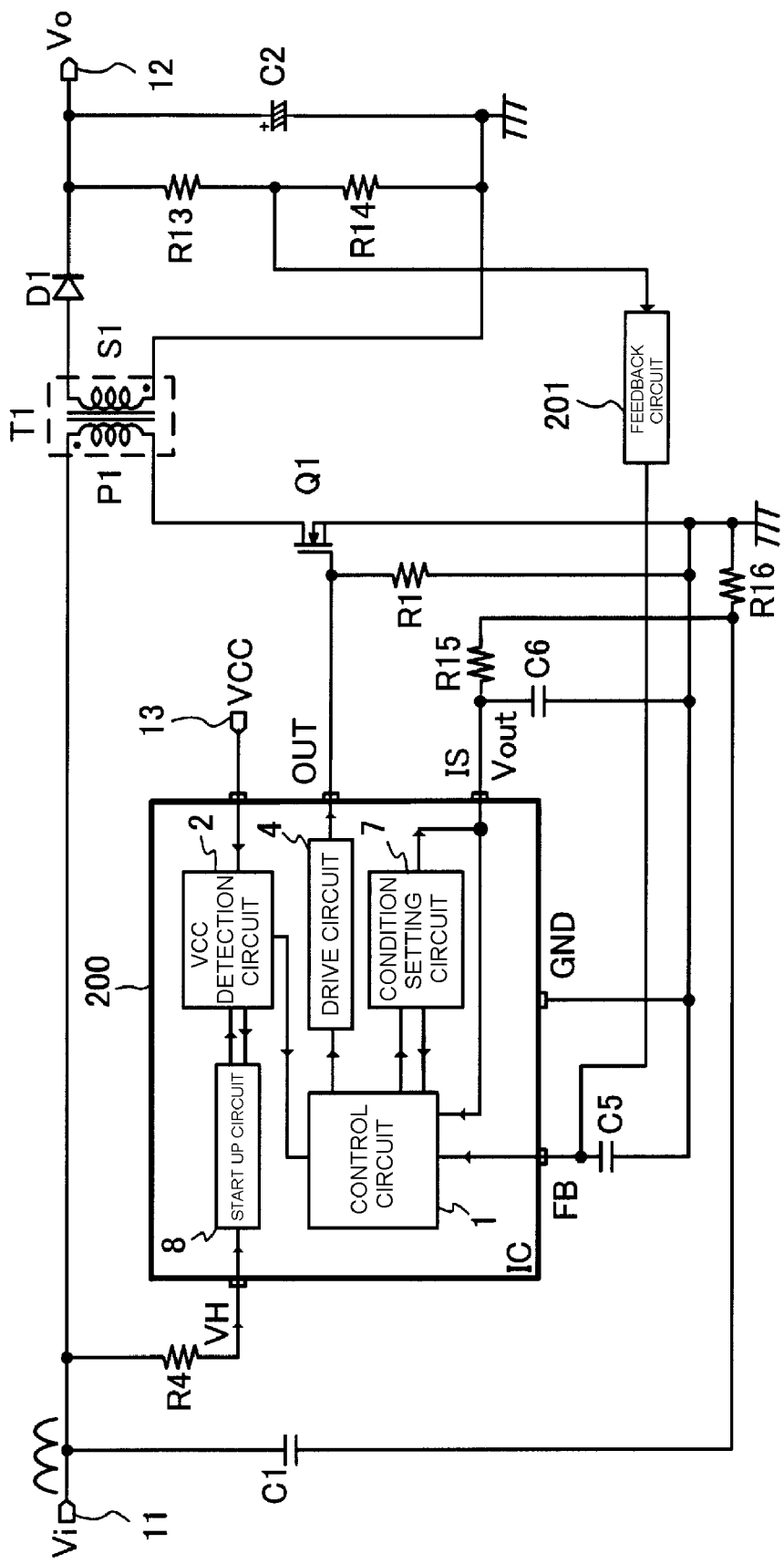
FIG. 14 is a circuit diagram showing a switching power supply device according to Embodiment 5 of the invention.

FIG. 14 is a circuit diagram showing a switching power supply device according to Embodiment 5 of the invention.

In Embodiment 5, a point differing from the switching power supply device of the heretofore described Embodiment 4 is that the IS terminal of the power supply control IC 200 is connected via the resistor R15 to a connection point of a capacitor C1 and a shunt resistor R16 serially connected between the input terminal 11 and the ground. Because of this, operation condition setting is possible even when a negative current flows through the IS terminal.

The invention can be applied to either of an isolated type switching power supply device and a non-isolated type switching power supply device. In the heretofore described embodiments, it is clear that even in a case in which an example is given with one type of switching power supply device, application is possible in the same way to the other type.

INDUSTRIAL APPLICABILITY

Applying the invention to a switching power supply device having a condition setting function, and to an operation condition setting method thereof, it is possible to easily set function parameters and/or an operation mode without adding a dedicated condition setting terminal to a power supply control IC.

The above simply shows a principle of the invention. Furthermore, a multiple of modifications and changes being possible for those skilled in the art, the invention is not limited to the heretofore shown and described accurate configurations and practical examples, and all corresponding modification examples and equivalents are seen to fall within the scope of the invention as described in the attached claims and equivalents.

The invention claimed is:

1. A switching power supply device having an input power supply and a load, comprising:
   a switching element disposed between the input power supply and the load;

an inductive circuit coupled to the input power supply, supplying a current to the switching element;

a power supply control integrated circuit for controlling the switching element to apply a constant output voltage to the load, the power supply control integrated circuit including a control circuit that controls operations of the power supply control integrated circuit, a drive circuit that, under the control of the control circuit, drives to turn on or off the switching element, a condition setting circuit that, under the control of the control circuit, determines an operation condition of the switching power supply device, and outputs a condition indicating signal indicating the operation condition, a control signal output terminal for outputting a drive signal to the switching element, and a current signal input terminal for inputting a sense current signal to the power supply control integrated circuit; and a resistor of an adjustable resistance connected to the control signal output terminal, or to the current signal input terminal, wherein the condition setting circuit injects a current from the control signal output terminal or from the current signal input terminal into the resistor, detects a voltage generated at the control signal output terminal, and determines the condition indicating signal using the detected voltage.

2. The switching power supply device of claim 1, wherein the power supply control integrated circuit further includes an oscillator circuit that regulates a switching frequency of the switching element in accordance with the condition indicating signal.

3. The switching power supply device of claim 2, wherein the switching power supply device selects one of a fixed frequency mode and a variable frequency mode for the oscillator circuit using the condition indicating signal.

4. The switching power supply device of claim 1, wherein the drive circuit sends an on/off control signal to a gate terminal of the switching element via a resistor circuit that includes another resistor.

5. The switching power supply device of claim 1, wherein the drive circuit sends an on/off control signal to a gate terminal of the switching element via a buffer circuit.

6. The switching power supply device of claim 1, wherein the condition setting circuit controls an amount of the current injected from the control signal output terminal during an initialization period, and determines the condition indicating signal in accordance with the detected voltage and the amount of the injected current.

7. The switching power supply device of claim 1, wherein the switching power supply device selects one of an overcurrent protection level, an overvoltage protection level, a latch mode when there is an overload, and a restart mode using the condition indicating signal.

8. The switching power supply device of claim 1, wherein the inductive circuit includes a transformer.

9. The switching power supply device of claim 1, wherein the inductive circuit includes a reactor.

10. The switching power supply device of claim 1, wherein the operation condition of the switching power supply device is set within an initialization period between a start of a supply of power to the integrated circuit and a start of an on/off control of the switching element.

11. An integrated circuit for controlling a switching power supply device, the switching power supply device including a resistor of an adjustable resistance, a switching element disposed between an input power supply and a load, and an inductive circuit coupled to the input power supply and supplying a current to the switching element, the resistor, the switching element and the inductive circuit being arranged to apply a constant output voltage to the load, the integrated circuit comprising:

a control circuit that controls operations of the integrated circuit;

a drive circuit that, under the control of the control circuit, drives to turn on or off the switching element;

a condition setting circuit that, under the control of the control circuit, determines an operation condition of the switching power supply device, and outputs a condition indicating signal indicating the operation condition;

a control signal output terminal for outputting a drive signal to the switching element, and a current signal input terminal for inputting a sense current signal to the power supply control integrated circuit, the resistor being in connection with the control signal output terminal or to the current signal input terminal, wherein the condition setting circuit injects a current from the control signal output terminal or the current signal input terminal into the resistor, detects a voltage generated at the control signal output terminal, and determines the condition indicating signal using the detected voltage.

12. The integrated circuit of claim 11, wherein the operation condition of the switching power supply device is set within an initialization period between a start of a supply of power to the integrated circuit and a start of an on/off control of the switching element.

13. An operation condition setting method of a switching power supply device, the switching power supply device including a switching element disposed between an input power supply and a load, an inductive circuit coupled to the input power supply and supplying a current to the switching element, and a power supply control integrated circuit for controlling the switching element to apply a constant output voltage to the load, the integrated circuit having a control signal output terminal for outputting a drive signal to the switching element, and a current signal input terminal for inputting a sense current signal to the integrated circuit, the method comprising:

during an initiation period between a start of a supply of power to the integrated circuit and a start of an on/off control of the switching element, outputting a current from the control signal output terminal, or from the current signal input terminal, detecting a voltage of the control signal output terminal, forming a condition indicating signal based on a result of the detection, and setting an operation condition of the switching power supply device in accordance with the condition indicating signal; and maintaining the operation condition of the switching power supply device set based on the condition indicating signal after the initialization period has elapsed.

14. The operation condition setting method of claim 13, wherein a predetermined operation condition is set by setting an overcurrent protection level or an overvoltage protection level in the switching power supply device, or by selecting a latch mode when there is an overload, a restart mode, a fixed frequency mode, or a variable frequency mode.

* * * * *